(12) United States Patent
Ederer et al.

(10) Patent No.: US 8,727,672 B2
(45) Date of Patent: May 20, 2014

(54) METHOD AND DEVICE FOR CONVEYING PARTICULATE MATERIAL DURING THE LAYER-WISE PRODUCTION OF PATTERNS

(75) Inventors: Ingo Ederer, Geltendorf (DE); Andreas Hartman, Stadtbergen (DE)

(73) Assignee: Voxeljet AG, Friedberg (DE)

( * ) Notice: Subject to any disclaimer, the term of this patent is extended or adjusted under 35 U.S.C. 154(b) by 710 days.

(21) Appl. No.: 12/681,961

(22) PCT Filed: Oct. 6, 2008

(86) PCT No.: PCT/DE2008/001602
§ 371 (c)(1),
(2), (4) Date: Apr. 7, 2010

(87) PCT Pub. No.: WO2009/052773
PCT Pub. Date: Apr. 30, 2009

(65) Prior Publication Data
US 2010/0272519 A1    Oct. 28, 2010

(30) Foreign Application Priority Data
Oct. 21, 2007  (DE) .................. 10 2007 050 679

(51) Int. Cl.
*B65G 53/00*   (2006.01)
(52) U.S. Cl.
USPC ............. 406/197; 406/53; 406/106; 406/198; 406/164
(58) Field of Classification Search
USPC ........ 406/54, 55, 106, 164, 197, 198; 700/98, 700/119
See application file for complete search history.

(56) References Cited

U.S. PATENT DOCUMENTS

| 643,882 | A | 2/1900 | McClave |
| 951,665 | A | 3/1910 | Swindell |
| 1,356,837 | A | 10/1920 | Stegmaier |
| 1,421,896 | A | 7/1922 | Benedict |
| 1,535,341 | A | 4/1925 | Riley |
| 2,358,956 | A | 9/1944 | Ashbaugh |
| 2,388,805 | A | 11/1945 | Stahl |
| 2,390,154 | A | 12/1945 | Kessler |
| 2,640,629 | A | 6/1953 | Thomson et al. |
| 2,692,142 | A | 10/1954 | Hunter |
| 2,798,256 | A | 7/1957 | Eynard |

(Continued)

FOREIGN PATENT DOCUMENTS

| DE | 4325573 | 2/1995 |
| DE | 29506204.5 | 4/1995 |

(Continued)

OTHER PUBLICATIONS

Cima et al., "Computer-derived Microstructures by 3D Printing: Bio- and Structural Materials," SFF Symposium, Austin, TX, 1994.

(Continued)

*Primary Examiner* — Joseph Dillon, Jr.
(74) *Attorney, Agent, or Firm* — The Dobrusin Law Firm, P.C.

(57) ABSTRACT

The present invention relates to a method for conveying particulate material during the manufacture of patterns in layers, wherein powder is conveyed out of a reservoir into a spreader unit and, if applicable, excess powder fed to the spreader unit is again conveyed back into the reservoir and wherein this conveying takes place in a closed conveying circuit.

10 Claims, 10 Drawing Sheets

(56) References Cited

U.S. PATENT DOCUMENTS

| | | |
|---|---|---|
| 2,857,938 A | 10/1958 | Wahl |
| 3,289,898 A | 12/1966 | Herman |
| 3,377,001 A | 4/1968 | Hazard |
| 3,616,969 A | 11/1971 | Koizumi |
| 3,616,972 A | 11/1971 | Christy |
| 3,646,595 A * | 2/1972 | Williams .................... 55/284 |
| 3,722,747 A | 3/1973 | Petit |
| 143,613 A | 10/1973 | Bucklin |
| 3,815,178 A * | 6/1974 | Goldman ..................... 19/205 |
| 3,815,527 A | 6/1974 | Dobbins |
| 3,913,503 A | 10/1975 | Becker |
| 4,239,715 A | 12/1980 | Pratt |
| 4,247,508 A | 1/1981 | Housholder |
| 4,279,949 A | 7/1981 | Esser |
| 4,369,025 A | 1/1983 | Von Der Weid |
| 4,455,111 A * | 6/1984 | Jackson et al. ............... 406/56 |
| 4,575,330 A | 3/1986 | Hull |
| 4,579,252 A | 4/1986 | Wilson |
| 4,630,755 A | 12/1986 | Campbell |
| 4,669,634 A | 6/1987 | Leroux |
| 4,711,607 A * | 12/1987 | Wynosky et al. ............. 406/30 |
| 4,726,715 A * | 2/1988 | Steen et al. .................. 406/55 |
| 4,752,352 A | 6/1988 | Feygin |
| 4,889,433 A | 12/1989 | Pratt |
| 4,938,816 A | 7/1990 | Beaman et al. |
| 4,951,417 A * | 8/1990 | Gerken et al. ................ 47/1.42 |
| 5,017,753 A | 5/1991 | Deckard |
| 5,053,090 A | 10/1991 | Beaman et al. |
| 5,076,869 A | 12/1991 | Bourell et al. |
| 5,083,710 A * | 1/1992 | McLoughlin et al. ........ 239/690 |
| 5,127,037 A | 6/1992 | Bynum |
| 5,132,143 A | 7/1992 | Deckard |
| 5,147,587 A | 9/1992 | Marcus et al. |
| 5,155,324 A | 10/1992 | Deckard et al. |
| 5,156,697 A | 10/1992 | Bourell et al. |
| 5,178,496 A * | 1/1993 | Trieb et al. .................. 406/14 |
| 5,182,170 A | 1/1993 | Marcus et al. |
| 5,204,055 A | 4/1993 | Sachs et al. |
| 5,213,271 A * | 5/1993 | Uribe et al. .................. 239/654 |
| 5,221,539 A | 6/1993 | Pallerberg et al. |
| 5,248,456 A | 9/1993 | Evans et al. |
| 5,252,264 A | 10/1993 | Forderhase et al. |
| 5,284,695 A | 2/1994 | Barlow et al. |
| 2,296,062 A | 3/1994 | Bourell et al. |
| 5,311,921 A * | 5/1994 | Smets .......................... 164/268 |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,431,967 A | 7/1995 | Manthiram et al. |
| 5,433,520 A | 7/1995 | Adams |
| 5,482,659 A | 1/1996 | Sauerhoefer |
| 5,490,962 A | 2/1996 | Cima et al. |
| 5,505,567 A * | 4/1996 | Scott ............................ 406/106 |
| 5,506,607 A | 4/1996 | Sanders, Jr. et al. |
| 5,518,680 A | 5/1996 | Cima et al. |
| 5,573,055 A | 11/1996 | Melling et al. |
| 5,597,589 A | 1/1997 | Deckard |
| 5,601,868 A | 2/1997 | Gerhardt |
| 5,616,294 A | 4/1997 | Deckard |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,681,132 A * | 10/1997 | Sheppard, Jr. ................ 406/61 |
| 5,730,925 A | 3/1998 | Wilkening et al. |
| 5,753,274 A | 5/1998 | Wilkening et al. |
| 5,807,437 A | 9/1998 | Sachs et al. |
| 5,843,513 A | 12/1998 | Wilke et al. |
| 5,851,465 A | 12/1998 | Bredt |
| 5,902,441 A | 5/1999 | Bredt et al. |
| 5,902,537 A | 5/1999 | Almquist et al. |
| 5,934,343 A | 8/1999 | Gaylo et al. |
| 5,943,235 A | 8/1999 | Earl et al. |
| 5,964,985 A * | 10/1999 | Wootten ......................... 201/40 |
| 5,965,170 A | 10/1999 | Matsuoka et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,094,994 A | 8/2000 | Satake et al. |
| 6,116,517 A | 9/2000 | Heinz et al. |
| 6,146,567 A | 11/2000 | Sachs et al. |
| 6,147,138 A | 11/2000 | Hochsmann et al. |
| 6,155,331 A | 12/2000 | Langer et al. |
| 6,193,922 B1 | 2/2001 | Ederer |
| 6,217,816 B1 | 4/2001 | Tang |
| 6,227,769 B1 * | 5/2001 | Wilson et al. ................. 406/181 |
| 6,258,170 B1 | 7/2001 | Somekh et al. |
| 6,305,769 B1 | 10/2001 | Thayer et al. |
| 6,316,060 B1 | 11/2001 | Elvidge et al. |
| 6,322,728 B1 | 11/2001 | Brodkin et al. |
| 6,375,874 B1 | 4/2002 | Russell et al. |
| 6,401,001 B1 | 6/2002 | Jang et al. |
| 6,403,002 B1 | 6/2002 | Van der Geest |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,500,378 B1 | 12/2002 | Smith |
| 6,554,600 B1 | 4/2003 | Hofmann et al. |
| 6,610,429 B2 | 8/2003 | Bredt et al. |
| 6,733,528 B2 | 5/2004 | Abe et al. |
| 6,742,456 B1 * | 6/2004 | Kasperchik et al. .......... 101/483 |
| 6,764,636 B1 | 7/2004 | Allanic et al. |
| 6,830,643 B1 | 12/2004 | Hayes |
| 6,838,035 B1 | 1/2005 | Ederer et al. |
| 6,855,205 B2 * | 2/2005 | McQuate et al. ............. 118/301 |
| 6,972,115 B1 * | 12/2005 | Ballard ....................... 422/186.04 |
| 7,004,222 B2 | 2/2006 | Ederer et al. |
| 7,037,382 B2 * | 5/2006 | Davidson et al. ............... 134/21 |
| 7,087,109 B2 * | 8/2006 | Bredt et al. ................... 106/691 |
| 7,137,431 B2 | 11/2006 | Ederer |
| 7,137,759 B1 * | 11/2006 | Ambs ............................. 406/55 |
| 7,204,684 B2 | 4/2007 | Ederer et al. |
| 7,332,537 B2 * | 2/2008 | Bredt et al. ................... 524/423 |
| 7,435,368 B2 * | 10/2008 | Davidson et al. ............. 264/113 |
| 7,531,117 B2 | 5/2009 | Ederer |
| 7,550,518 B2 * | 6/2009 | Bredt et al. ................... 523/160 |
| 7,665,636 B2 | 2/2010 | Ederer |
| 7,736,578 B2 | 6/2010 | Ederer |
| 7,748,971 B2 | 7/2010 | Hochsmann |
| 7,767,130 B2 | 8/2010 | Elsner |
| 7,879,393 B2 * | 2/2011 | Ederer et al. .................. 427/203 |
| 7,887,264 B2 * | 2/2011 | Naunheimer et al. ........ 406/192 |
| 7,927,539 B2 * | 4/2011 | Ederer .......................... 264/405 |
| 8,039,059 B2 * | 10/2011 | Ishihara ........................ 427/426 |
| 8,568,124 B2 * | 10/2013 | Brunermer ................. 425/174.4 |
| 2001/0045678 A1 * | 11/2001 | Kubo et al. ................. 264/37.29 |
| 2001/0050031 A1 | 12/2001 | Bredt et al. |
| 2002/0026982 A1 | 3/2002 | Bredt et al. |
| 2002/0155254 A1 * | 10/2002 | McQuate et al. ............. 428/156 |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0056378 A1 | 3/2004 | Bredt et al. |
| 2004/0094058 A1 | 5/2004 | Kasperchik et al. |
| 2004/0170765 A1 | 9/2004 | Ederer et al. |
| 2005/0167872 A1 | 8/2005 | Tsubaki et al. |
| 2006/0013659 A1 * | 1/2006 | Pfeiffer et al. ................. 406/106 |
| 2006/0105102 A1 | 5/2006 | Hochsmann et al. |
| 2006/0175346 A1 | 8/2006 | Ederer et al. |
| 2007/0054143 A1 * | 3/2007 | Otoshi ........................... 428/532 |
| 2007/0065397 A1 * | 3/2007 | Ito et al. ....................... 424/76.2 |
| 2008/0001331 A1 | 1/2008 | Ederer |
| 2008/0299321 A1 * | 12/2008 | Ishihara ........................ 427/426 |

(56) References Cited

U.S. PATENT DOCUMENTS

| | | | | |
|---|---|---|---|---|
| 2012/0329943 | A1* | 12/2012 | Hicks et al. | 524/590 |
| 2013/0157193 | A1* | 6/2013 | Moritani et al. | 430/109.4 |

FOREIGN PATENT DOCUMENTS

| | | |
|---|---|---|
| DE | 4400523 | 7/1995 |
| DE | 4440397 | 9/1995 |
| DE | 29701279 | 1/1997 |
| DE | 19511772 | 9/1997 |
| DE | 19723892 | 9/1998 |
| DE | 19853834 | 11/1998 |
| DE | 19846478 | 4/2000 |
| DE | 10047614 | 4/2002 |
| DE | 10117875 | 1/2003 |
| DE | 10216013 | 10/2003 |
| DE | 102005056260 | 11/2005 |
| EP | 0431924 B1 | 6/1991 |
| EP | 0711213 | 5/1995 |
| EP | 0361847 | 11/1995 |
| EP | 0688262 | 12/1995 |
| EP | 0431924 | 1/1996 |
| EP | 0739666 | 10/1996 |
| EP | 0734842 | 8/1999 |
| EP | 1163999 | 5/2001 |
| EP | 0968776 | 10/2002 |
| EP | 1415792 | 5/2004 |
| EP | 1442870 | 8/2004 |
| FR | 2790418 | 9/2000 |
| GB | 2382798 | 11/2003 |
| WO | 95/18715 A1 | 7/1995 |
| WO | 96/05038 A1 | 2/1996 |
| WO | 98/28124 | 2/1998 |
| WO | 00/21736 A1 | 4/2000 |
| WO | 00/51809 A1 | 9/2000 |
| WO | 00/78485 | 12/2000 |
| WO | 01/26885 A1 | 4/2001 |
| WO | 01/34371 A2 | 5/2001 |
| WO | 0172502 A1 | 10/2001 |
| WO | 02/26419 A1 | 4/2002 |
| WO | 02/26420 A1 | 4/2002 |
| WO | 02/064353 A1 | 8/2002 |
| WO | 02/064354 A1 | 8/2002 |
| WO | 02/083323 A2 | 10/2002 |
| WO | 03/016030 A1 | 2/2003 |
| WO | 03/016067 A2 | 2/2003 |
| WO | 03/086726 A1 | 10/2003 |
| WO | 03/097518 A2 | 11/2003 |
| WO | 03/103932 A1 | 12/2003 |
| WO | 2004/010907 A1 | 2/2004 |
| WO | 2004/112988 A2 | 12/2004 |
| WO | 2005/080010 A1 | 9/2005 |
| WO | 2005/113219 A1 | 12/2005 |

OTHER PUBLICATIONS

EOS Operating Manual for Laser Sintering Machine with Brief Summary.
Sachs et al., "Three-Dimensional Printing: Rapid Tooling and Prototypes Directly from a CAD Model", Massachusetts Institute of Technology, pp. 143-151.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal.
Williams, "Feasibility Study of Investment Casting Pattern Design by Means of Three Dimensional Printing", Department of Machanical Enginerring.
Gephart, Rapid Prototyping, pp. 118-119.
Marcus et al., Solid Freedom Fabrication Proceedings, Nov. 1993.
Opposition of Patent No. DE10047614, Jun. 25, 2003.
Opposition to European Patent No. 1322458 B1, Jan. 19, 2005.
International Search Report, PCT/DE02/01103, (Published as WO2002/083323), Sep. 30, 2002.
International Search Report, PCT/DE00/03324, (Published as WO2002/026419), Jun. 5, 2001.
International Search Report, PCT/DE01/03661, (Published as WO2002/026420), Feb. 28, 2002.
Marcus, et al., Solid Freeform Fabrication Proceedings, Sep. 1995, p. 130-33.
Sachs et al., "Three-Dimensional Printing: Rapid Retooling and Prototypes Directly from a CAD Model", Massachusetts Institute of Technology, pp. 131-136.

* cited by examiner

METHOD AND DEVICE FOR CONVEYING PARTICULATE MATERIAL DURING THE LAYER-WISE PRODUCTION OF PATTERNS

CLAIM OF PRIORITY

This application is a national phase of PCT application No. PCT/DE2008/001602, filed Oct. 6, 2008, which claims priority to German Application No. DE 10 2007 050 679.3, filed Oct. 21, 2007, all of which are incorporated by reference herein.

FIELD OF THE INVENTION

The invention relates to a method and to a device for conveying particulate material during the manufacture of patterns in layers.

BACKGROUND

Methods for producing three-dimensional components have already been known for a long time.

European patent specification EP 0 431 924 B1, for example, describes a method for producing three-dimensional objects from computer data. A particulate material is thereby applied onto a platform in a thin layer and said platform is selectively imprinted with a binder material by means of a print head. The particulate area, which is imprinted with the binder, adheres and solidifies under the impact of the binder and an additional hardener, if applicable. The platform is subsequently lowered by a layer thickness in a construction cylinder and is provided with a new layer of particulate material, which is also imprinted, as is described above. These steps are repeated until a certain, desired height of the object is reached. A three-dimensional object is thus created from the imprinted and solidified areas.

After its completion, this object, which is produced from solidified particulate material, is embedded in the loose particulate material and is subsequently freed therefrom. This takes place, for example, by means of a vacuum cleaner. Thereafter, the desired objects, which are then freed from the residual powder, e.g., by means of brushing, remain.

Other powder-supported rapid-prototyping processes, such as the selective laser sintering or the electron beam sintering, e.g., in the case of which a loose particulate material is also in each case applied in layers and is selectively solidified by means of a controlled physical source of radiation, also operate in a similar manner.

All of these methods will be combined herein below under the term "three-dimensional print processes".

In the case of the three-dimensional print process known from the state of the art, the particulate material is typically applied by means of a spreader unit. In the case of a low fill level, this spreader unit must be filled with particulate material from a reservoir.

Different methods and device are known from the state of the art for this purpose.

WO 98/28124 A1, for instance, describes a method, in the case of which the powder material is pushed onto a workspace via a piston and is applied from there via rollers onto the area, which is to be coated.

A device for filling a spreader device is further known from WO 00/78485 A2, in the case of which a reservoir is arranged in an end position of the spreader device thereabove, with said reservoir encompassing a sliding closure, wherein this sliding closure can be opened, if needed, and the spreader device can thus be filled.

A device, in the case of which the conveying of the particulate material out of the reservoir into the spreader device takes place via a conveyor belt, is furthermore known from the same patent application.

WO 2003/97518 further describes the conveying of the particulate material out of the reservoir into the spreader system via a slider.

A conveying device, which uses a belt transport system comprising conveyor cages for transporting particulate material to the spreader device, is further known from US 2004/0012112 A1.

A further possibility for conveying particulate material out of a reservoir into a spreader system is described in DE 10 2005 056 260 A1. In the case of a low fill level, the spreader unit is hereby filled with particulate material from a reservoir in such a manner that the fill level in the spreader unit reaches a predetermined level across the entire length of the spreader device even in the case of a previously irregular fill level.

In the case of these methods and devices for filling a spreader unit for fluids, which are known from the state of the art, it has proven to be disadvantageous that one fill level control is always necessary. An uneven filling across the length of the spreader device can furthermore only be compensated for to an unsatisfactory degree with the methods from the state of the art.

SUMMARY OF THE INVENTION

It is thus the objective of the present invention to provide a method and a device to refrain from using a fill level control and to evenly fill the spreader device across the entire length.

This objective is solved by means of a method for conveying particulate material during the manufacture of patterns in layers, wherein powder from a reservoir is conveyed into a spreader unit and, if applicable, excess powder fed to the spreader unit is again conveyed back into the reservoir and wherein this conveying takes place in a closed conveying circuit.

In the case of such a method according to the invention, it is now possible for particulate material to be conveyed out of a reservoir into the spreader system and for excess powder to again be conveyed back to the reservoir by means of conveying the particular material in a conveying circuit.

The spreader system is thus filled until it is filled completely and excess particulate material is again fed back directly to the reservoir. This means that the filling runs for a certain (reliable) period and that one can be sure that the spreader device is filled completely. In the event that the spreader device is full, the excess particulate material is simply conveyed back to the reservoir.

Accordingly, pursuant to a first aspect of the present invention, there is contemplated a method for conveying particulate material during the manufacture of patterns in layers, wherein powder is conveyed out of a reservoir into a spreader unit and, if applicable, excess powder fed to the spreader unit is again conveyed back into the reservoir and wherein this conveying takes place in a closed conveying circuit.

The first aspect of the present invention may be further characterized by one or any combination of the features described herein, such as the powder conveying takes place via screw conveyors; the powder conveying takes place via low pressure; the powder conveying of the conveying circuit takes place via an individual conveying systems; the powder conveying of the conveying circuit takes place via a plurality of conveying systems; the powder conveying of the conveying circuit takes place via conveyor belts and/or conveyor cages; the powder conveying out of the reservoir into the spreader system takes place via an ejection system; the conveying circuit conveys excess powder material back into the reservoir after the coating process.

Accordingly, pursuant to a second aspect of the present invention, there is contemplated a device for conveying particulate material during the manufacture of patterns in layers, encompassing a reservoir, a spreader unit and a powder conveying system, wherein at least the reservoir and the spreader unit are contained in a closed conveying circuit.

The second aspect of the present invention may be further characterized by one or any combination of the features described herein, such as provision is furthermore made for an ejection system; the reservoir is arranged below the spreader unit in vertical direction, thus viewed in the direction at right angles to the coating direction, at least during filling process; the powder conveying system encompasses at least one conveyor belt; the powder conveying system encompasses screw conveyors; the powder conveying system encompasses a suction device for low pressure conveying; the ejection system encompasses two covers comprising slits; the ejection system encompasses two tubes located within one another and comprising boreholes, which are arranged so as to be offset; provision is furthermore made for a junction for introducing new powder material into the reservoir.

DETAILED DESCRIPTION OF THE INVENTION

According to the present invention, a closed conveying system thus refers to a system, in the case of which a conveying to the spreader device system takes place and from there also back into the reservoir, if applicable.

According to a preferred embodiment of the present invention, the conveying of powder could take place via screw conveyors.

Apart from this or in addition thereto, it would also be possible for the conveying of powder to take place via low pressure.

A conveying via low pressure can be advantageous in particular when the conveying is to take place in a conveying system, which is closed off from the environment.

In the case of the method according to the invention, it can furthermore be advantageous when the conveying of powder of the conveying circuit takes place via an individual conveying system. The different conveying systems must then possibly not be coordinated.

However, it is also possible for the conveying of powder of the conveying circuit to take place via a plurality of conveying systems in the case of the method according to the invention.

The conveying of the particulate material out of the reservoir into the spreader system and back to the reservoir can take place via all possible conceivable individual or a plurality of conveying methods in the case of a method according to the invention. In addition to screw conveyors and low pressure, this could be conveyor belts and/or conveyor cages, for example.

According to the present invention, it can furthermore also be advantageous when the conveying of powder out of the reservoir into the spreader system takes place via an ejection system.

Such an embodiment of the present invention has thus proven to be particularly advantageous, because an even filling can take place in the spreader system due to the use of the ejection device.

According to a preferred embodiment, it can be advantageous in the case of the method according to the invention when the conveying circuit also conveys excess powder material back into the reservoir after the spreading process. If applicable, this excess particulate material from the coating method could also be cleaned before it is conveyed back to the reservoir. A conveying could thus take place through a screen, for example.

The objective of the present invention is further solved by means of a device for conveying particulate material during manufacture of patterns in layers encompassing a reservoir, a spreader unit and a powder conveying system, wherein at least the reservoir and the spreader unit are contained in a closed conveying circuit.

According to a preferred embodiment of the device according to the invention, provision is furthermore made for an ejection system. Such an ejection system can be suitable to attain a particularly even level distribution of the particulate material in the spreader system.

It can be advantageous in particular with reference to the machine geometry when the reservoir in the case of the device according to the invention is arranged below the spreader unit in vertical direction, thus viewed in the direction at right angles to the coating direction, at least during a filling process.

It can furthermore be advantageous for the device according to the invention when the powder conveying system encompasses at least one conveyor belt.

In addition, it would also be possible, however, for the device as a powder conveying system to encompass screw conveyors and/or a suction device for the low pressure conveying.

In the event that the device according to the invention encompasses an ejection system according to a preferred embodiment, it may be advantageous for the ejection system to encompass two covers comprising slits.

In addition, it is also possible for the device to be provided in such a manner that the ejection system encompasses two tubes located within one another and comprising boreholes or slits, which are arranged so as to be offset.

In the event a junction for introducing new powder material into the reservoir is provided according to the invention, the refilling of particulate material into the reservoir is possibly particularly simple and clean.

To elaborate in more detail, the invention will be described in more detail below by means of preferred exemplary embodiments with reference to the drawing.

Figure 1:
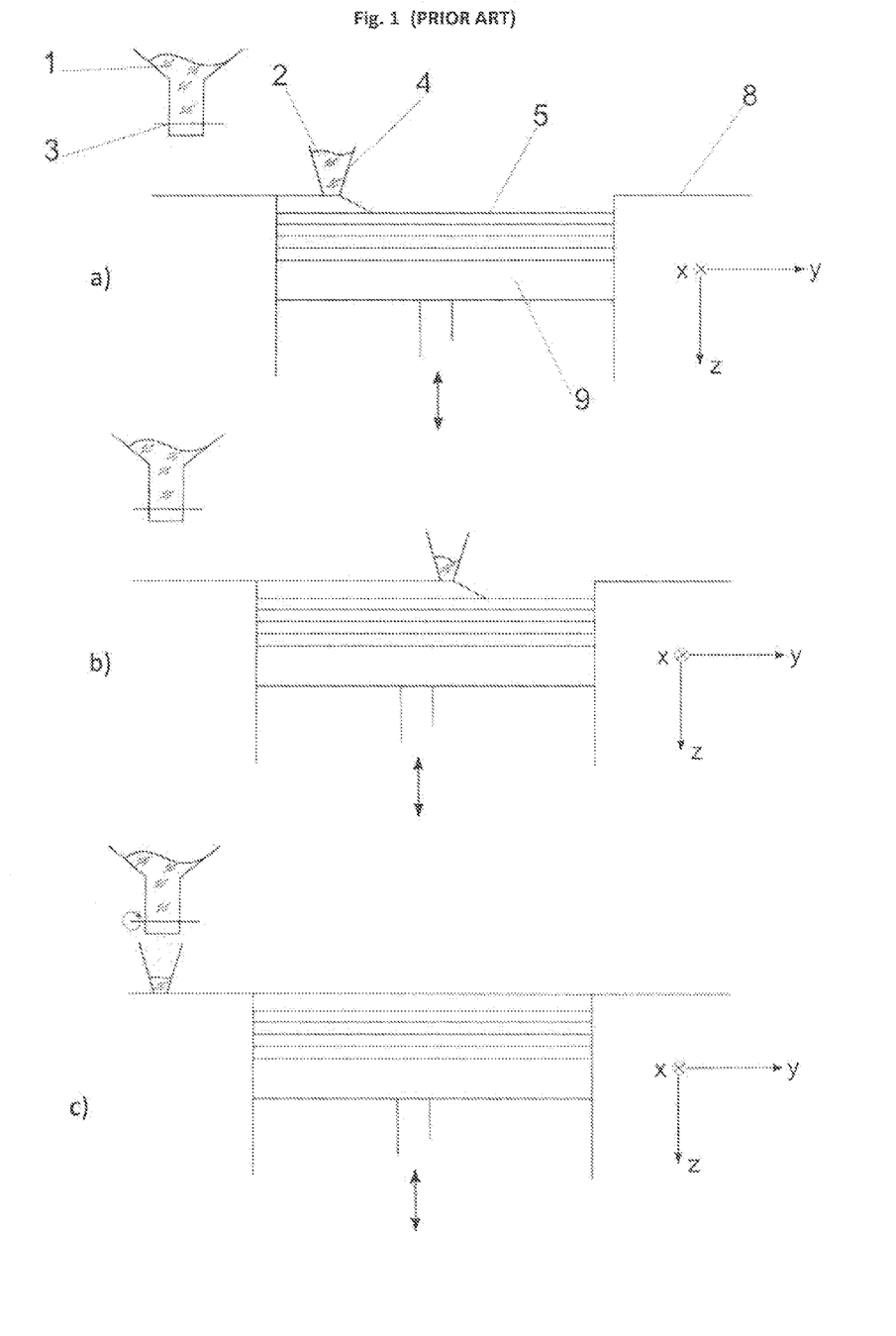
FIG. 1 shows a common method for applying particulate material in layers.

FIG. 1 generally describes a particulate coating process.

The method according to the invention and the device according to the invention are to be explained in the following in an exemplary manner for the use during the assembling of casting patterns in layers from particulate material, binding material and hardener in the case of a rapid-prototyping method.

In the case of an assembling method of a component, which is described with reference to FIG. 1, such as of a casting pattern, for example, a build platform 9 on which the casting pattern is to be set up, is lowered by a layer thickness of the particulate material 2. Particulate material 2 is subsequently applied from a spreader system 4 onto the build platform 9 in a desired layer thickness.

The selective application of hardener onto areas, which are to be hardened, then takes place between the set-up of the individual layers.

At the onset of the coating process, the spreader system 4 is moved from a starting position across the workpiece platform. This is illustrated in FIG. 1a).

The spreader system 4 now moves across the build platform 9 at a constant speed. It thereby releases particulate material 2 in precisely the correct quantity and creates thin layers 5 of the particulate material 2 on the build platform 9. This is shown in FIG. 1b).

The spreader system 4 is subsequently moved back into the starting position and can be newly filled from a particulate reservoir 1 via a filling device by opening the ejection slider 3. This is shown in FIG. 1c).

Figure 2:
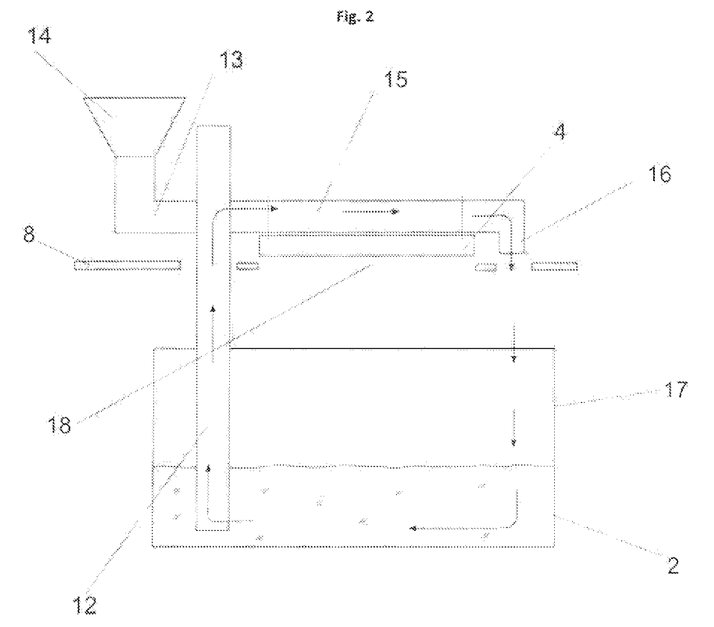
FIG. 2 shows a device according to the invention according to a preferred embodiment.

The filling of the spreader system 4 via a circuit system according to the invention is illustrated in FIG. 2.

As can be seen from the figure, the particulate material 2 is conveyed out of a reservoir 17 via a suction device 54, which is located below the level of the movement plane of the spreader device and below the machine table 8, via a first conveying system 12 to a level above the spreader device 4 for this purpose. This means that the reservoir is arranged below the spreader unit in vertical direction, thus viewed in the direction at right angles to the coating direction at least during a filling process.

The particulate material according to the shown preferred embodiment is realized via a shiftable ejection system 15 via a further conveying system 13 (separately or part of the first system). As illustrated the conveying system 13 is a conveyor belt 50. Excess powder is guided back again into the reservoir or into the reservoir chamber 17, respectively, via a bypass system 16.

In the case of the illustrated preferred embodiment of the invention, the component parts of the device, comprising conveying devices 12, 13, reservoir 17, ejection system 15, bypass 16 and spreader device 4 are arranged in a vertical plane parallel to the spreader device in response to the filling process. The advantage of this configuration lies in that excess powder or leakage can flow directly back into the reservoir.

Figure 3:
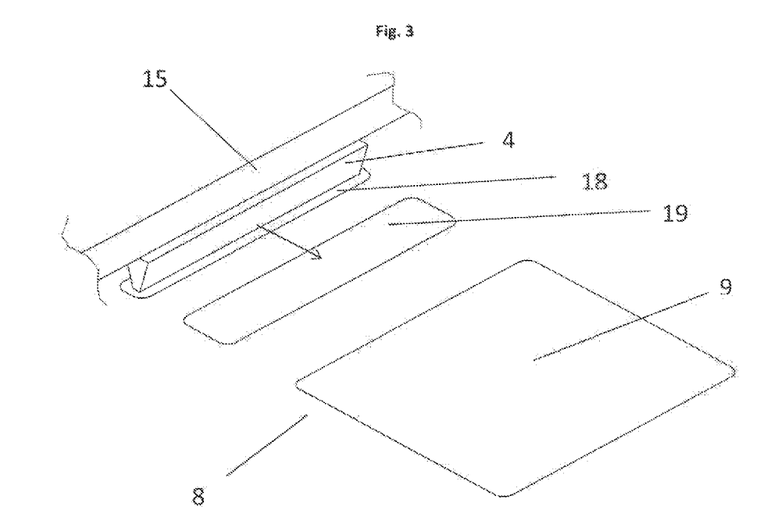
FIG. 3 shows a device according to the invention according to a further preferred embodiment.

FIG. 3 illustrated a further preferred embodiment of the invention. As can easily be seen in this figure, two openings 19, 18 are arranged in the machine table 8 comprising the build platform 9. A first opening 18 hereby serves for the powder return in the conveying circuit, in the case of which particulate material is conveyed from the reservoir 17 to the spreader device 4 and a second opening 19 for accommodating excess particulate material 11 of the coating process. This powder can have been contaminated by the building process.

It can thus be advantageous for it to be discharged into a separate container. In addition, however, it could also be the case that it is directly subjected to a cleaning.

Figure 4:
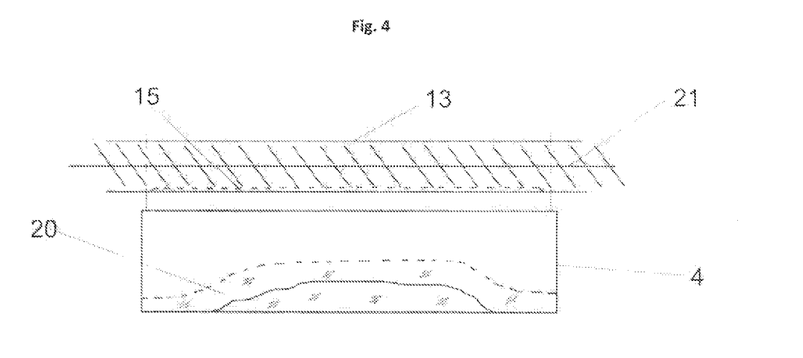
FIG. 4 shows a particularly preferred embodiment of a conveying system.

As is shown in FIG. 4, the conveying systems 12, 13 can be embodied according to a preferred embodiment by means of screw conveyors 21, which are embodied in tubes. Likewise, however, it is also possible to use conveyor belts, conveyor belts comprising conveyor cages or vacuum devices.

In the event that screw conveyors are used, it can be advantageous two separate systems 12, 13 are provided. A first screw conveyor takes over the transport of the powder to a level above the spreader device 4. Curved or beveled systems provide advantageous powder absorption from the reservoir 17, are particularly suitable. A second screw conveyor runs horizontally above the spreader device 4. It takes over the transport to the spreader device 4 and to the bypass 16.

For filling, the spreader device 4 moves into a position below the filling system. The coating reservoir is thereby preferably embodied in a funnel-shaped manner. As is illustrated in FIG. 3, only a narrow gap is located in the position between spreader device 4 and ejection system 15.

An ejection system 15 according to the present invention can be operated in all conceivable manners. As an example, two different systems are to be described herein with reference to FIGS. 4, 5 and 6.

Figure 7:
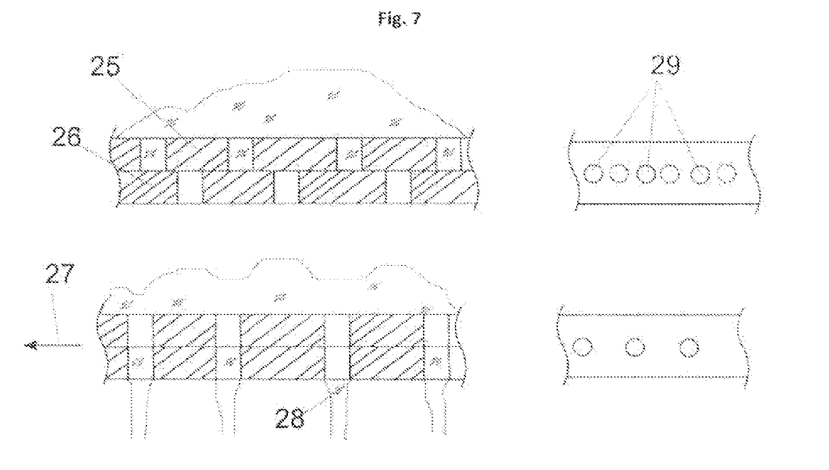
FIG. 7 shows a preferred embodiment of the ejection system.

For example, an ejection device 15 can be opened according to a method, which is known from the state of the art, in response to a filled transport system and the available powder can thus be shaken off. The conveying device is thereby not active. In the case of this method, a defined powder quantity is refilled into the spreader device. This is illustrated in FIG. 7 using reference numeral 20. Level differences within the spreader device, which are created during the building process, can only be compensated to a limited extent in the case of this type of operation. Such a filling is called impact filling.

Figure 5:
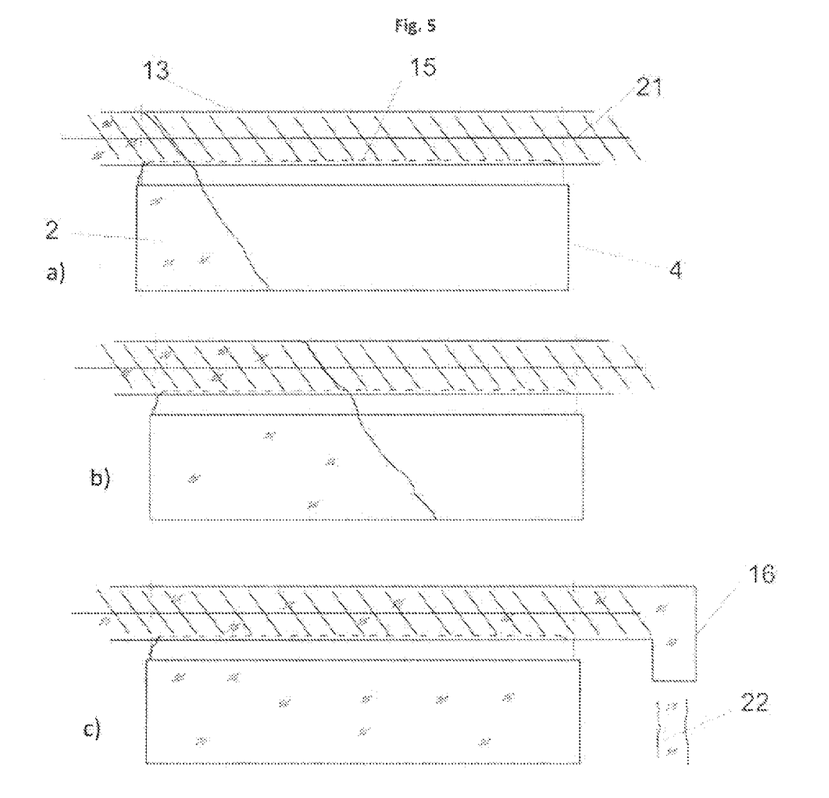
FIG. 5 shows a further preferred embodiment of a conveying system.
Figure 6:
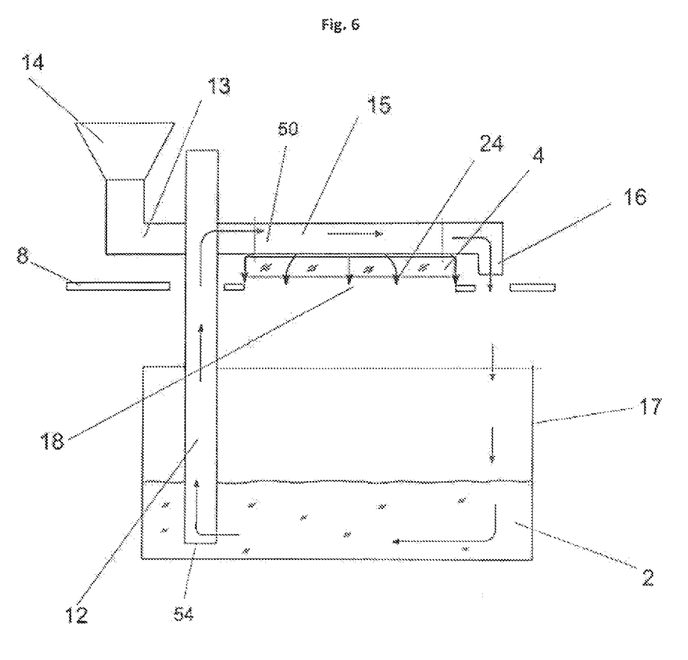
FIG. 6 shows yet a further preferred embodiment of a conveying system.

According to a preferred embodiment of the present invention, the spreader device can be filled in that the ejection device 15 is opened and the conveying system 12, 13 is activated. As is illustrated in FIG. 5, the spreader device 4 is filled with particulate material 2 in transport direction of the transport device. In the case of an excessive filling time, excess powder falls past the spreader device 4 and back into the reservoir 6. This is illustrated in FIG. 6 by means of reference numeral 24. It would furthermore also be possible for the excess powder to be fed back to the powder circuit via the bypass opening 16. This is illustrated by means of reference numeral 22 in FIG. 5. Such a filling is called level filling.

An advantage of such a level filling is that, in connection with the circuit system, the filling can take place without a sensor. Due to the fact that a resupply can on principle take place without any disadvantages for any amount of time in the case of a completely filled spreader device, no particular actions must be taken to protect all involved aggregates. The fill level can be secured via a simple preselection of the filling period.

A further advantage lies in the even filling across the length of the spreader device.

In many cases, the fill level can change across the length during the building process due to uneven powder outflow out of the spreader device. An even refilling can be guaranteed in the case of each refilling by means of the level filling.

According to a preferred embodiment of the invention shown in FIG. 7, the ejection device is embodied as a cover system. In the case of such an embodiment, two thin disks 25, 26 comprising boreholes 29 or slits are used in the ejection system. The hole pattern of the one disk corresponds to the second hole pattern, but is shifted to one another. Powder can escape 28 in the event that the disks are moved against one another 27 so that the hole patterns coincide. Gravity forces it to flow into the spreader device.

The embodiment of such a system can be as a rectangular tube, for example, wherein the underside encompasses a hole pattern. An additional displaceable disk comprising a hole pattern completes the system.

Figure 8:
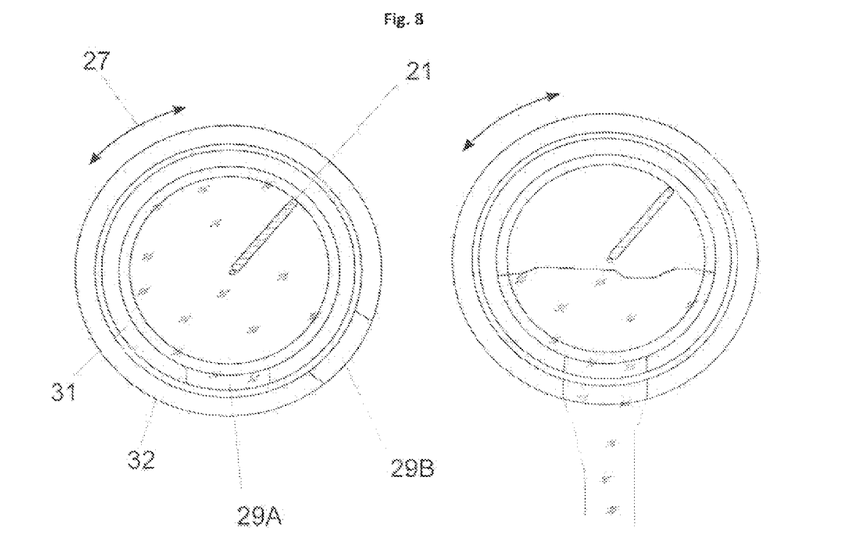
FIG. 8 shows a further preferred embodiment of the ejection system according to the invention.

An embodiment of the ejection system, in the case of which the described hole patterns are realized on two tubes 31, 32, which run into one another, is particularly preferred. Such an embodiment can be seen in FIG. 8. In the case of this system, the opening for the powder discharge is attained by means of rotating the tubes against one another. The inner tube 31 encompasses a row of boreholes 29A at the lowermost location. The system is open in the event that the row of boreholes 29B of the outer tube 32 is also brought into this position.

A tube cover system comprising a screw conveyor 21 in the interior is furthermore particularly preferred. The above-described level filling can be realized in a particularly advantageous manner by means of such a system.

Figure 9:
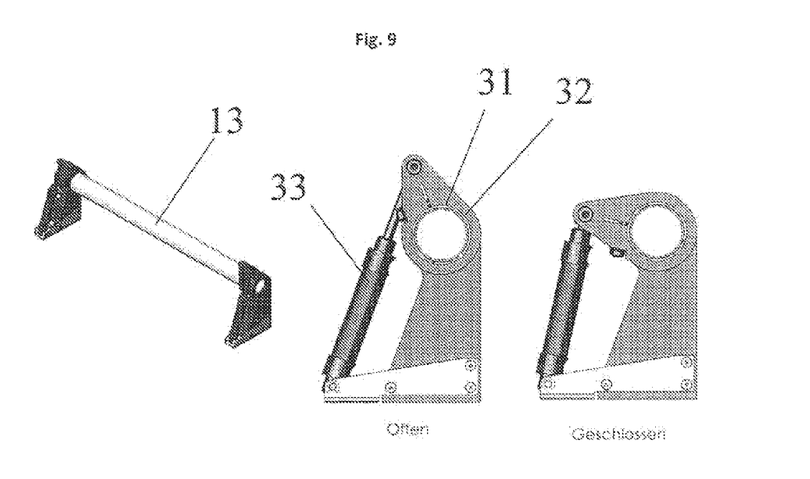
FIG. 9 shows yet a further preferred embodiment of the ejection system.

The afore-described systems can be activated in different manners. According to a preferred embodiment, pneumatic electromagnetic and hydraulic actuators 33 are suitable. See FIG. 9.

Figure 10:
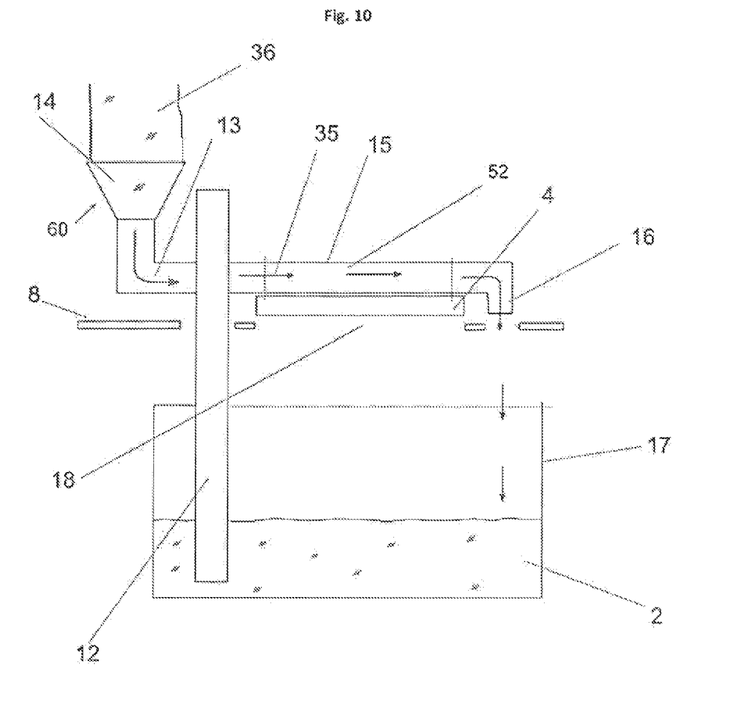
FIG. 10 shows a further preferred embodiment of a conveying system.

In addition, provision can be made in the powder circuit for a connection for fresh powder. This is illustrated in FIG. 10. Such a fresh powder connection 14 has a junction 60 and is advantageously connected to one of the already necessary conveying systems 12, 13 and moved using a conveyor cage 52.

The advantage as compared to the simple refilling into the reservoir 6 lies in the constructively possible lower dust exposure for the user.

A system, in the case of which closed powder kegs 36 are placed onto a connecting spigot comprising a funnel tube 14 and supply the system with fresh powder is particularly preferred.

Figure 11:
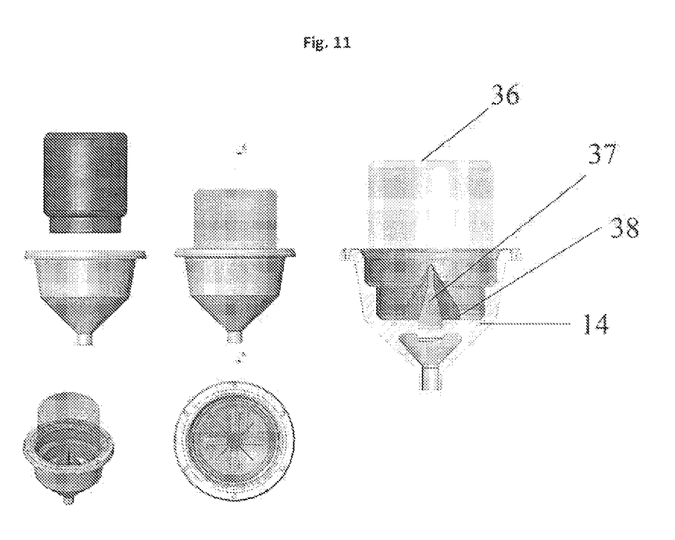
FIG. 11 shows a refilling device according to a preferred embodiment of the invention.

As is illustrated in FIG. 11 in an exemplary manner, the kegs can be provided with a membrane 38, which is opened only when placed onto the funnel 37. Plastic, metal or paper are suitable as membrane substances.

The method according to the invention thus uses a powder circuit for filling purposes, which makes it possible to fulfill the posed demands. Powder loss can be avoided by means of the embodiment of the powder conveyance in a circuit-like manner. A return of excess powder makes it possible to fill the spreader device carriage at high speed to an even level. A refilling device, which provides for a low-dust refilling, can be used at the circuit. On the one hand, this benefits the safety and the comfort of the user and, on the other hand, the explosion protection requirements.

The invention claimed is:

1. A method comprising:
   forming three dimension objects comprising the steps of:
   1) providing a device for conveying particulate material comprising:
      a) a reservoir;
      b) a spreader unit; and
      c) a plurality of particulate material conveying systems including a first particulate material conveying system having a screw conveyor and a second particulate material conveying system having a screw conveyor;
   2) forming a first layer of the three dimension object by a layer forming step comprising:
      a) conveying the particulate material out of the reservoir into the spreader unit with at least the first particulate material conveying system;
      b) spreading the particulate material unit unto a build platform with the spreader; and
      c) conveying excess particulate material that was fed to the spreader unit back into the reservoir after the step of spreading; and
   3) forming a second layer of the three dimensional object by a layer forming step by repeating steps 2a, 2b and 2c;
   wherein the steps 2a and 2c of conveying takes place in a closed conveying circuit that includes the plurality of particulate material conveying systems.

2. The method of claim 1, wherein the step of conveying the excess particulate material back into the reservoir takes place using a bypass opening in the particulate material conveying system.

3. The method according to claim, wherein the step 2a of conveying the particulate material takes place via low pressure.

4. The method according to claim 1, wherein the closed conveying circuit conveys the excess particulate material back into the reservoir after a coating process.

5. The method of claim 1, wherein the device for conveying particulate material includes an ejection system.

6. The method of claim 1, wherein the reservoir is arranged below the spreader unit in a vertical direction, when viewed in a direction at a right angle to a coating direction, at least during a filling process.

7. The method of claim 1, wherein at least one of the plurality of particulate material conveying systems comprises at least one conveyor belt, and
   wherein the device for conveying particulate material includes a junction for introducing anew powder material into the reservoir.

8. The method of claim 1, wherein the step 2a of conveying the particulate material out of the reservoir into the spreader further employs the second particulate material conveying system, and
   wherein the device for conveying particulate material includes a junction for introducing a new powder material into the reservoir.

9. The method of claim 1, wherein at least one of the particulate material conveying systems comprises a suction device for low pressure conveying, and
   wherein the device for conveying particulate material includes a junction for introducing anew powder material into the reservoir.

10. The method of claim 5, wherein the ejection system comprises two covers comprising slits, and
    wherein the device for conveying particulate material includes a junction for introducing anew powder material into the reservoir.

* * * * *

UNITED STATES PATENT AND TRADEMARK OFFICE
CERTIFICATE OF CORRECTION

PATENT NO. : 8,727,672 B2  
APPLICATION NO. : 12/681961  
DATED : May 20, 2014  
INVENTOR(S) : Ederer et al.

Page 1 of 1

It is certified that error appears in the above-identified patent and that said Letters Patent is hereby corrected as shown below:

In the Claims

Column 8, Line 24, insert --1-- after "according to claim"

Column 8, Line 40, delete "anew", insert --a new--

Column 8, Line 53, delete "anew", insert --a new--

Column 8, Line 58, delete "anew", insert --a new--

Signed and Sealed this  
Thirtieth Day of September, 2014

Michelle K. Lee  
*Deputy Director of the United States Patent and Trademark Office*